United States Patent
Mathew et al.

(10) Patent No.: US 8,467,177 B2
(45) Date of Patent: Jun. 18, 2013

(54) DISPLAYS WITH POLARIZER WINDOWS AND OPAQUE MASKING LAYERS FOR ELECTRONIC DEVICES

(75) Inventors: Dinesh C. Mathew, Fremont, CA (US); Keith J. Hendren, Capitola, CA (US); Jun Qi, Cupertino, CA (US); Victor H. Yin, Cupertino, CA (US); Thomas W. Wilson, Jr., Saratoga, CA (US); Adam T. Garelli, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 31 days.

(21) Appl. No.: 12/916,474

(22) Filed: Oct. 29, 2010

(65) Prior Publication Data

US 2012/0106063 A1  May 3, 2012

(51) Int. Cl.
*G06F 1/16* (2006.01)

(52) U.S. Cl.
USPC ......... 361/679.21; 349/62; 362/157; 455/566

(58) Field of Classification Search
USPC ............... 349/58, 62; 362/97.3, 206, 235, 362/157; 361/679.22, 679.44, 679.41, 679.08, 361/679.58, 679.27, 679.21, 679.29; 455/557, 455/415, 420, 566
See application file for complete search history.

(56) References Cited

U.S. PATENT DOCUMENTS

| | | | |
|---|---|---|---|
| 4,181,756 A * | 1/1980 | Fergason | 427/163.1 |
| 4,769,680 A | 9/1988 | Resor, III et al. | |
| 5,032,007 A | 7/1991 | Silverstein et al. | |
| 5,359,206 A | 10/1994 | Yamamoto et al. | |
| 5,481,430 A | 1/1996 | Miyagawa et al. | |
| 5,539,550 A | 7/1996 | Spitzer et al. | |
| 5,572,343 A | 11/1996 | Okamura et al. | |
| 5,623,392 A | 4/1997 | Ma | |
| 5,678,483 A | 10/1997 | Johnson | |
| 5,708,561 A | 1/1998 | Huilgol et al. | |
| 5,739,800 A | 4/1998 | Lebby et al. | |
| 5,748,270 A | 5/1998 | Smith | |

(Continued)

FOREIGN PATENT DOCUMENTS

| | | |
|---|---|---|
| JP | 06-245209 | 2/1994 |
| JP | 3387136 | 9/1994 |

(Continued)

OTHER PUBLICATIONS

Mathew et al., U.S. Appl. No. 13/249,174, filed Sep. 29, 2011.

(Continued)

*Primary Examiner* — Hung Duong
(74) *Attorney, Agent, or Firm* — Treyz Law Group; David C. Kellogg; Louis R. Levenson

(57) ABSTRACT

An electronic device may have a display. Inactive portions of the display such as peripheral portions of the display may be masked using an opaque masking layer. An opening may be provided in the opaque masking layer to allow light to pass. For example, a logo may be viewed through an opening in the opaque masking layer and a camera may receive light through an opening in the opaque masking layer. The display may include upper and lower polarizers, a color filter layer, and a thin-film transistor layer. The opaque masking layer may be formed on the upper polarizer, may be interposed between the upper polarizer and the color filter layer, or may be interposed between the color filter layer and the thin-film transistor layer. The upper polarizer may have unpolarized windows for cameras, logos, or other internal structures.

33 Claims, 17 Drawing Sheets

U.S. PATENT DOCUMENTS

| | | |
|---|---|---|
| 5,760,858 A | 6/1998 | Hodson et al. |
| 5,851,411 A | 12/1998 | An et al. |
| 5,889,568 A | 3/1999 | Seraphim et al. |
| 5,940,153 A | 8/1999 | Castaneda et al. |
| 5,965,916 A | 10/1999 | Chen |
| 5,988,827 A | 11/1999 | Lee |
| 5,990,986 A | 11/1999 | Song et al. |
| 6,104,461 A | 8/2000 | Zhang et al. |
| 6,278,504 B1 | 8/2001 | Sung |
| 6,335,773 B1 | 1/2002 | Kamei et al. |
| 6,483,719 B1 | 11/2002 | Bachman |
| 6,525,786 B1 | 2/2003 | Ono |
| 6,532,152 B1 | 3/2003 | White |
| 6,570,757 B2 | 5/2003 | DiFonzo et al. |
| 6,919,678 B2 | 7/2005 | Ozolins et al. |
| 6,940,564 B2 | 9/2005 | Murden et al. |
| 7,013,558 B2 | 3/2006 | Bachman |
| 7,035,090 B2 | 4/2006 | Tanaka et al. |
| 7,133,104 B2 | 11/2006 | Kim et al. |
| 7,161,185 B2 | 1/2007 | Yamazaki et al. |
| 7,217,588 B2 | 5/2007 | Hartzell et al. |
| 7,237,941 B2 | 7/2007 | Hsieh et al. |
| 7,245,333 B2 | 7/2007 | Nam et al. |
| 7,253,869 B1 | 8/2007 | Russell et al. |
| 7,425,749 B2 | 9/2008 | Hartzell et al. |
| 7,489,291 B2 | 2/2009 | Yamazaki et al. |
| 7,522,236 B2 | 4/2009 | Gettemy et al. |
| 7,551,358 B2 | 6/2009 | Lee et al. |
| 7,569,410 B2 | 8/2009 | Hartzell et al. |
| 7,582,904 B2 | 9/2009 | Fujii et al. |
| 7,585,121 B2 | 9/2009 | Tsai |
| 7,629,613 B2 | 12/2009 | Sohn et al. |
| 7,646,959 B2 * | 1/2010 | Sato ............................. 385/142 |
| 7,663,607 B2 | 2/2010 | Hotelling et al. |
| 7,728,906 B2 | 6/2010 | Bilbrey |
| 7,728,937 B2 | 6/2010 | Kume et al. |
| 7,790,487 B2 | 9/2010 | Shih et al. |
| 7,812,920 B2 | 10/2010 | Lino |
| 7,813,042 B2 | 10/2010 | Mather et al. |
| 7,821,561 B2 | 10/2010 | Tsuboi |
| 7,830,370 B2 | 11/2010 | Yamazaki et al. |
| 7,852,440 B2 | 12/2010 | Kunimori et al. |
| 7,859,606 B2 | 12/2010 | Higaki et al. |
| 7,868,957 B2 | 1/2011 | Yamazaki et al. |
| 7,894,021 B2 | 2/2011 | Yang et al. |
| 7,933,123 B2 | 4/2011 | Wang et al. |
| 7,936,346 B2 | 5/2011 | Kunimori et al. |
| 8,049,221 B2 | 11/2011 | Komori |
| 2001/0000676 A1 | 5/2001 | Zhang et al. |
| 2001/0019130 A1 | 9/2001 | Yamazaki et al. |
| 2002/0051112 A1 | 5/2002 | Katsura |
| 2002/0063253 A1 | 5/2002 | Hong et al. |
| 2003/0133070 A1 | 7/2003 | Nam et al. |
| 2003/0161093 A1 | 8/2003 | Lam et al. |
| 2004/0095526 A1 | 5/2004 | Yamabuchi et al. |
| 2004/0212555 A1 | 10/2004 | Falco |
| 2004/0263670 A1 | 12/2004 | Yaasaki |
| 2005/0018121 A1 | 1/2005 | Jen et al. |
| 2005/0041166 A1 | 2/2005 | Yamazaki et al. |
| 2005/0078252 A1 | 4/2005 | Lin |
| 2005/0195621 A1 | 9/2005 | Chang et al. |
| 2005/0214984 A1 | 9/2005 | Maruyama et al. |
| 2005/0270438 A1 | 12/2005 | Konuma et al. |
| 2005/0285996 A1 | 12/2005 | Nakamura et al. |
| 2006/0001802 A1 | 1/2006 | Kao |
| 2006/0012969 A1 | 1/2006 | Bachman |
| 2006/0033874 A1 | 2/2006 | Sakama et al. |
| 2006/0113894 A1 | 6/2006 | Fujii et al. |
| 2006/0125982 A1 | 6/2006 | Lin et al. |
| 2006/0138296 A1 | 6/2006 | Deluga |
| 2006/0148425 A1 | 7/2006 | Carlson |
| 2006/0176417 A1 | 8/2006 | Wu et al. |
| 2006/0227232 A1 | 10/2006 | Zhang et al. |
| 2006/0279652 A1 | 12/2006 | Yang |
| 2007/0002216 A1 | 1/2007 | Chang et al. |
| 2007/0109461 A1 | 5/2007 | Park |
| 2007/0126966 A1 | 6/2007 | Takahashi |
| 2007/0153177 A1 | 7/2007 | Zhang et al. |
| 2007/0189730 A1 | 8/2007 | Okamura |
| 2007/0291172 A1 | 12/2007 | Kouzimoto et al. |
| 2008/0036942 A1 | 2/2008 | Hsieh |
| 2008/0049004 A1 | 2/2008 | Kunimori et al. |
| 2008/0057604 A1 | 3/2008 | Tanaka |
| 2008/0068484 A1 | 3/2008 | Nam |
| 2008/0079860 A1 | 4/2008 | Kunimori et al. |
| 2008/0239754 A1 | 10/2008 | Kang et al. |
| 2008/0261057 A1 | 10/2008 | Slobodin |
| 2008/0291356 A1 | 11/2008 | Kim |
| 2009/0085848 A1 | 4/2009 | Huang et al. |
| 2009/0091673 A1 | 4/2009 | Chen et al. |
| 2009/0153762 A1 | 6/2009 | Kuwabara et al. |
| 2009/0212300 A1 | 8/2009 | Komori |
| 2009/0237602 A1 | 9/2009 | Kubota et al. |
| 2009/0237957 A1 | 9/2009 | Tsubaki |
| 2009/0262277 A1 | 10/2009 | Kim |
| 2009/0273550 A1 | 11/2009 | Vieri et al. |
| 2009/0279284 A1 | 11/2009 | Takeuchi et al. |
| 2009/0280606 A1 | 11/2009 | Shih et al. |
| 2009/0310068 A1 | 12/2009 | Sakai |
| 2010/0001973 A1 | 1/2010 | Hotelling et al. |
| 2010/0020277 A1 | 1/2010 | Morita |
| 2010/0026656 A1 | 2/2010 | Hotelling et al. |
| 2010/0033647 A1 | 2/2010 | Okita et al. |
| 2010/0039530 A1 | 2/2010 | Guo et al. |
| 2010/0079942 A1 | 4/2010 | Yamamoto et al. |
| 2010/0097525 A1 | 4/2010 | Mino |
| 2010/0144391 A1 | 6/2010 | Chang et al. |
| 2010/0149743 A1 | 6/2010 | Shen |
| 2010/0167443 A1 | 7/2010 | Okada et al. |
| 2010/0182273 A1 | 7/2010 | Noguchi et al. |
| 2010/0182538 A1 | 7/2010 | Takata |
| 2010/0188605 A1 * | 7/2010 | Hasegawa et al. .............. 349/62 |
| 2010/0207857 A1 | 8/2010 | Gu et al. |
| 2010/0225844 A1 | 9/2010 | Kamada |
| 2010/0273530 A1 | 10/2010 | Jarvis et al. |
| 2010/0302478 A1 | 12/2010 | Nakagawa et al. |
| 2010/0309102 A1 | 12/2010 | Jung |
| 2010/0315570 A1 * | 12/2010 | Mathew et al. .................. 349/58 |
| 2010/0315769 A1 | 12/2010 | Mathew et al. |
| 2010/0315868 A1 | 12/2010 | Tokunaga et al. |
| 2010/0321325 A1 | 12/2010 | Springer et al. |
| 2011/0001706 A1 | 1/2011 | Sanford et al. |
| 2011/0005662 A1 | 1/2011 | Sung |
| 2011/0051411 A1 | 3/2011 | Kim et al. |
| 2011/0063550 A1 | 3/2011 | Gettemy et al. |
| 2011/0090444 A1 | 4/2011 | Kimura |
| 2011/0103041 A1 * | 5/2011 | Mathew et al. .............. 362/97.3 |
| 2011/0109829 A1 | 5/2011 | Mathew et al. |
| 2011/0149139 A1 | 6/2011 | Chang |
| 2011/0244656 A1 | 10/2011 | Dairiki et al. |
| 2012/0050975 A1 * | 3/2012 | Garelli et al. ............ 361/679.27 |
| 2012/0319966 A1 * | 12/2012 | Reynolds ....................... 345/173 |
| 2012/0327321 A1 * | 12/2012 | Huang et al. .................... 349/42 |

FOREIGN PATENT DOCUMENTS

| | | |
|---|---|---|
| JP | 6245209 | 9/1994 |
| JP | 2000330090 | 11/2000 |
| JP | 2000330090 A2 | 11/2000 |
| JP | 2001117077 | 4/2001 |
| JP | 2004-135275 | 4/2004 |
| JP | 2005-176151 | 6/2005 |
| JP | 2007241314 | 9/2007 |
| JP | 2009015272 | 1/2009 |
| JP | 2010 219948 | 9/2010 |
| KR | 100400714 | 9/2003 |
| KR | 2004017693 | 2/2004 |
| KR | 100809277 | 2/2008 |
| KR | 1020080058911 | 6/2008 |
| KR | 100856092 | 9/2008 |
| KR | 1020080089908 | 10/2008 |
| WO | 2008/120879 | 10/2008 |
| WO | 2010074144 | 1/2010 |

OTHER PUBLICATIONS

Mathew et al., U.S. Appl. No. 13/249,653, filed Sep. 30, 2011.
Mathew et al., U.S. Appl. No. 13/246,828, filed Sep. 30, 2011.

Mathew et al., U.S. Appl. No. 12/916,474, filed Oct. 29, 2010.
Mathew et al., U.S. Appl. No. 12/916,475, filed Oct. 29, 2010.
"LCD With Embedded Camera for Picture Telephone," IBM Corporation Research Disclosure 42572 Sep. 1999.
Sanford et al., U.S. Appl. No. 12/835,695, filed Jul. 13, 2010.
Sanford et al., U.S. Appl. No. 12/870,769, filed Aug. 27, 2010.
Garelli et al., U.S. Appl. No. 12/862,748, filed Aug. 24, 2010.
Mathew et al. U.S. Appl. No. 12/916,475, filed Oct. 29, 2010.

* cited by examiner

DISPLAYS WITH POLARIZER WINDOWS AND OPAQUE MASKING LAYERS FOR ELECTRONIC DEVICES

BACKGROUND

This invention relates to electronic devices and, more particularly, to display structures for electronic devices such as portable computers.

Electronic devices such as portable computers and cellular telephones typically have displays. To provide protection from damage, many displays are provided with cover glass layers. The cover glass layer helps protect underlying display structures from scratches and other damage during use of the electronic device. A patterned layer of black ink is sometimes formed on the underside of the cover glass layer to form an opaque border region. The opaque border region can hide internal device components from view. An opening in the black ink can be provided for a camera that is mounted behind the cover glass.

As device manufacturers strive to reduce device size and weight, it is becoming unacceptable to include potentially bulky and heavy display structures in a display. It may therefore be desirable to omit the cover glass layer from a display. Care must be taken, however, to ensure that unsightly internal components remain hidden from view and that internal components such as cameras are still able to function properly.

It would therefore be desirable to be able to provide improved display structures in electronic devices such as portable computers and cellular telephones.

SUMMARY

An electronic device such as a portable computer, cellular telephone, or other electronic equipment may have a display. The display may have an active portion such as a central rectangular region in which images are presented to a user of the device. Inactive portions of the display such as peripheral portions of the display may be masked using an opaque masking layer. The opaque masking layer may be formed from colored ink.

An opening may be provided in the opaque masking layer to allow light to pass. For example, a logo or other information may be viewed through an opening in the opaque masking layer. Cameras and other internal electronic components may receive light through an opening in the opaque masking layer.

The display may include upper and lower polarizers, a color filter layer, and a thin-film transistor layer. The opaque masking layer may be formed on the upper polarizer, may be interposed between the upper polarizer and the color filter layer, or may be interposed between the color filter layer and the thin-film transistor layer.

The upper polarizer may have unpolarized windows. The unpolarized windows may be formed by bleaching polarizer material within the polarizer. The polarizer material may be chemically bleached or may be bleached by exposure to ultraviolet light. The camera windows may be aligned with the openings in the opaque masking layer. A camera may be aligned with an unpolarized window in the polarizer and an opening in the opaque masking layer to receive image light. A logo may be aligned with an unpolarized window in a polarizer layer and an opening in the opaque masking layer so that the logo is visible from the exterior of the device. Other internal components of the electronic device such as sensors and status indicators may also be mounted beneath unpolarized windows in the polarizer and openings in the opaque masking layer.

Further features of the invention, its nature and various advantages will be more apparent from the accompanying drawings and the following detailed description of the preferred embodiments.

DETAILED DESCRIPTION

Electronic devices such as notebook computers, tablet computers, cellular telephones, and other computing equipment may be provided with displays.

Figure 1:
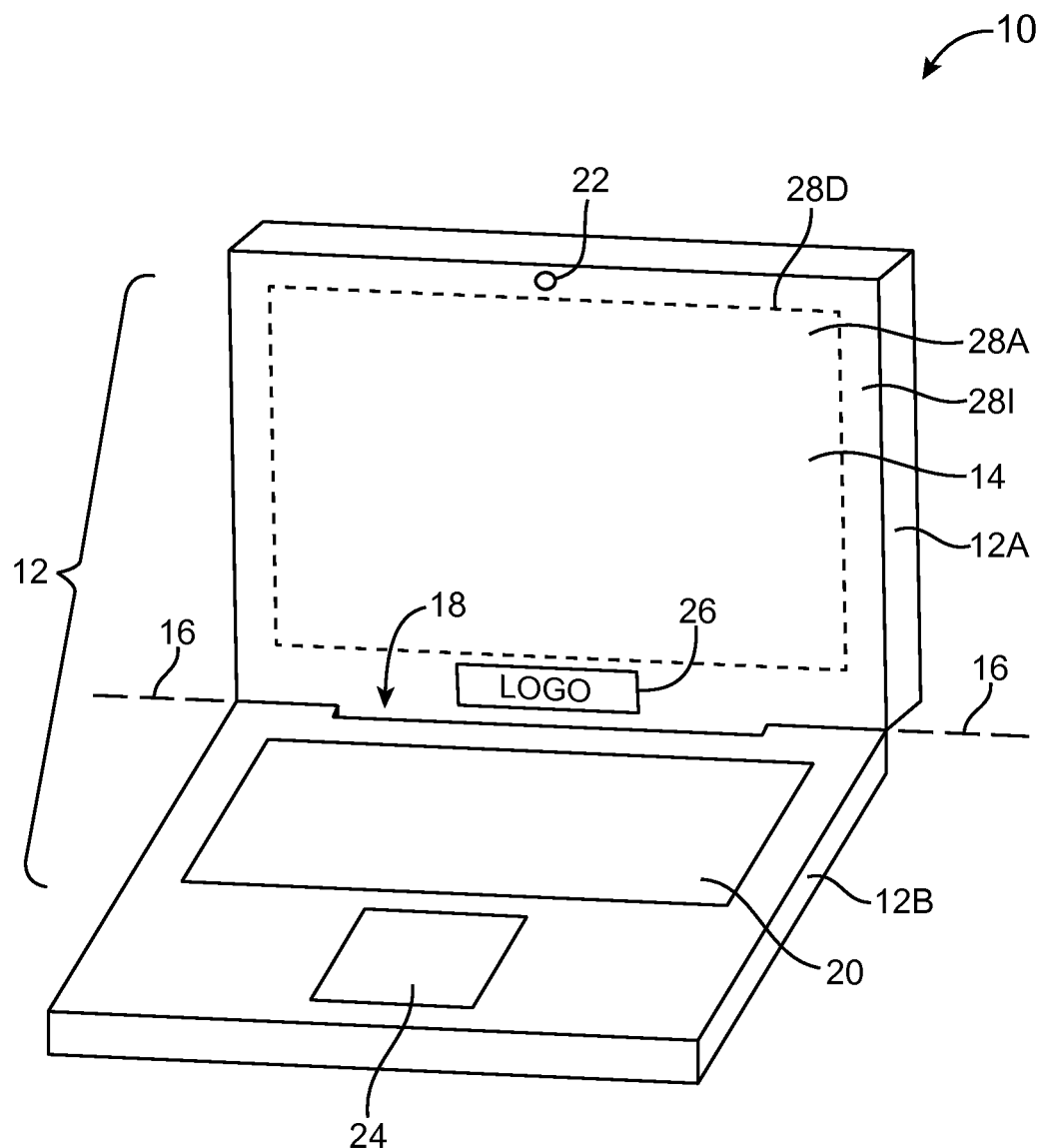
FIG. 1 is a perspective view of an illustrative portable computer with display structures in accordance with an embodiment of the present invention.

An illustrative electronic device such as a portable computer or other electronic equipment that has a display is shown in FIG. 1. As shown in FIG. 1, display 14 of device 10 may be mounted in upper housing portion 12A of housing 12. Housing 12 may be formed from a unibody construction in which some or all of housing 12 is formed form a unitary piece of material (e.g., metal, plastic, or fiber composite materials) or may be formed from multiple structures that have been mounted together using adhesive, fasteners, and other attachment mechanisms. For example, housing 12 may be formed from frame members and other internal supports to which external plates, housing sidewalls, bezel structures, and other structures are mounted.

Because housing portion 12A may be used to house display 14, housing portion 12A may sometimes be referred to as a display housing. Display housing 12A may be attached to housing portion 12B (sometimes referred to as a main unit or base housing) using hinge structures 18, so that display housing 12A may rotate relative to main housing 12B around hinge axis 16. Device 10 may include ports for removable media, data ports, keys such as keyboard 20, input devices such as track pad 24, microphones, speakers, sensors, status indicators lights, etc.

Display 14 may have an active portion and an inactive portion. Active portion 28A of display 14 may have a shape such as the rectangular shape that is bounded by dashed line 28D in FIG. 1. Inactive portion 28I of display 14 may have a rectangular ring shape or other suitable shape and may form a border around the periphery of display 14. Image pixel array elements such as liquid crystal diode image pixels or other active image pixel structures may be used in portion 28A to present images to a user of device 10. Inactive portion 28I is generally devoid of image pixel elements and does not participate in forming images for a user. To hide unsightly internal components from view, internal components in inactive portion 28I may be blocked from view using an opaque masking layer such as a layer of ink.

Device 10 may have components that are formed in inactive device region 28I. For example, device 10 may have a camera such as camera 22. Camera 22 may be mounted within display housing 12A and may operate through a window (sometimes referred to as a camera window) in display 14.

Information structures 26 such as a logo may be mounted on device 10. Information structures 26 may be a trademarked logo that represents a manufacturer of device 10, may be printed text, may be trademarked text, may be a design, may be personalized information (e.g., information identifying an owner of device 10), may be formed from a combination of text and non-text information, or may include other suitable content. Information structures 26 may be formed from patterned ink, patterned paint, patterned polymer, patterned metal traces, or other suitable materials.

Information structures 26 may be mounted in upper housing 12A. For example, information structures 26 or may be formed in inactive display region 28I of upper housing 12A under a transparent window in display 14.

Figure 2:
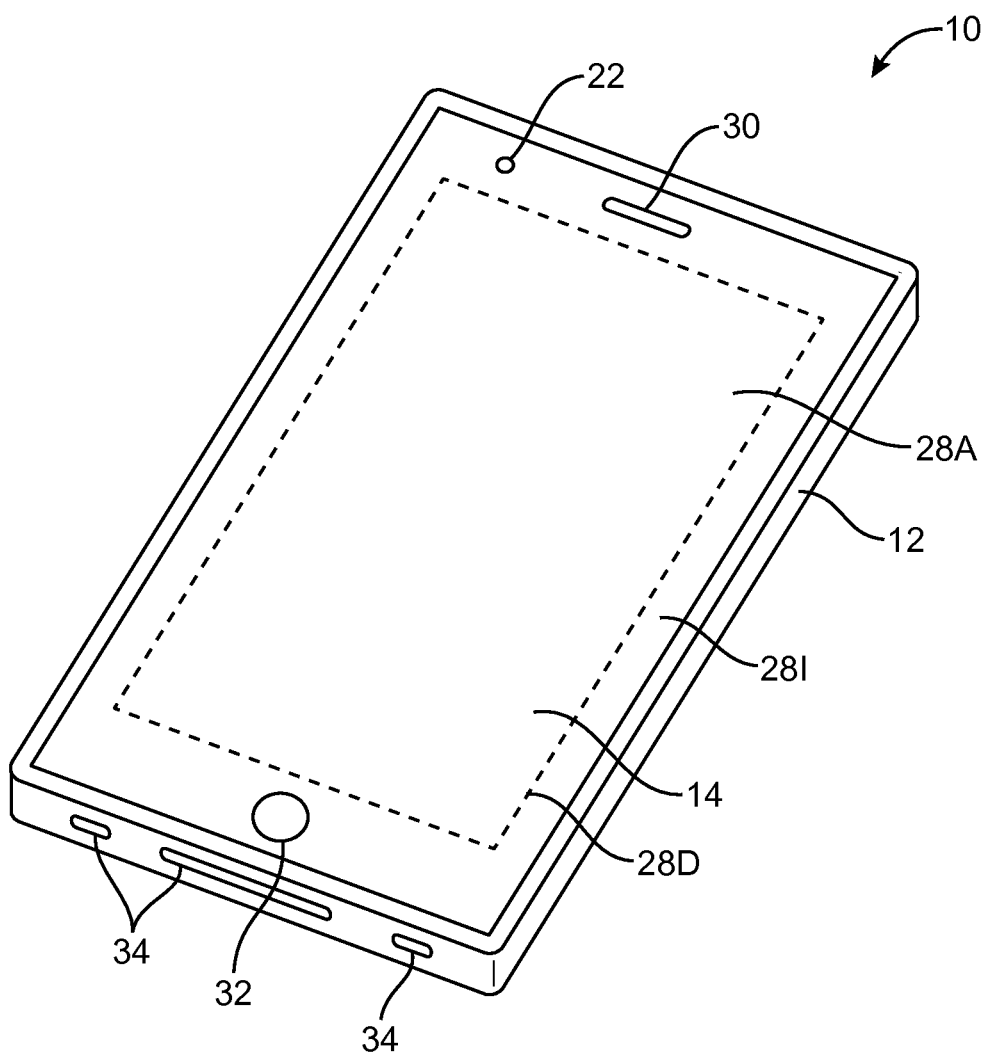
FIG. 2 is a perspective view of a handheld device in accordance with an embodiment of the present invention.

FIG. 2 is a perspective view of an illustrative configuration that may be used for a handheld electronic device. Electronic device 10 of FIG. 2 may be, for example, a cellular telephone or other handheld electronic equipment. Device 10 of FIG. 1 may have housing 12. Display 14 may be mounted within housing 12 on the front of device 10. Active portion 28A of display 14 may lie within rectangular boundary 28D. Inactive portion 28I of display 14 may form a boundary around the periphery of display 14. Housing 12 may have sidewalls that run around the periphery of device 10 (as an example). The sidewall structures of housing 12 may be formed from metal, plastic, glass, ceramic, carbon-fiber materials or other fiber-based composites, other materials, or combinations of these materials. The rear of housing 12 may be formed from metal, plastic, a planar member such as a glass or ceramic plate, fiber-based composites, other materials, or combinations of these materials.

Device 10 may have openings such as openings 34 in the sidewalls of housing 12. Openings 34 may be used to form microphone and speaker ports, openings to accommodate button members, openings for data ports and audio jacks, etc. One or more openings may be formed in inactive region 28I of display 14. For example, one or more openings may be formed in inactive region 28I for buttons such as button 32

(e.g., a menu button). Openings such as opening 30 may also be formed in inactive region 28I (e.g., to form a speaker port for an ear speaker).

Window 22 may be formed over an internal structure in device 10 such as a camera (as an example). If desired, windows such as window 22 may also be formed over information such as logo information (see, e.g., information structures 26 of FIG. 1) to allow the logo or other information to be viewed by a user of device 10.

The illustrative electronic device structures of FIGS. 1 and 2 are merely examples. Any suitable electronic devices 10 may be provided with displays 14. Electronic devices 10 may, for example, include tablet computers, wristwatch devices, pendant devices, other miniature and wearable devices, televisions, computer displays, accessories, etc.

Figure 3:
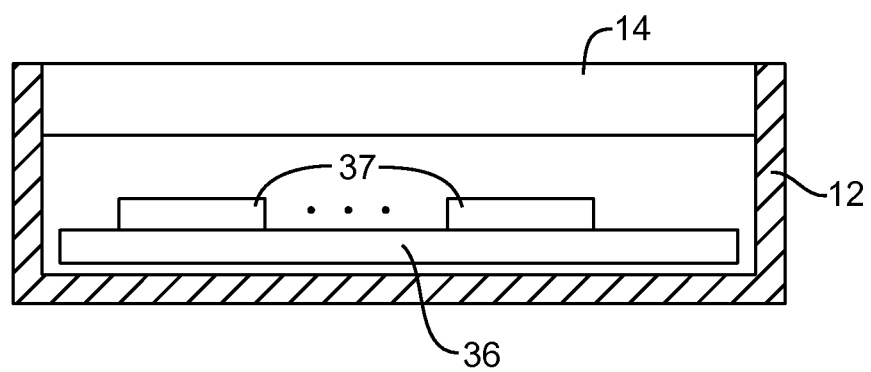
FIG. 3 is a cross-sectional side view of an electronic device having a display in accordance with an embodiment of the present invention.

A cross-sectional end view of an electronic device with a display (e.g., a device such as device 10 of FIG. 2, a portion of device 10 of FIG. 1, etc.) is shown in FIG. 3. As shown in FIG. 3, display 14 may be mounted within housing 12 so that the exterior surface of display 14 is exposed. Device housing 12 may be used to enclose printed circuit boards such as printed circuit board 36. Printed circuit board 36 may be a rigid printed circuit board such as a fiberglass-filled epoxy printed circuit board (e.g., FR4), a flexible printed circuit ("flex circuit") formed from a flexible dielectric such as a sheet of polyimide with patterned conductive traces, a rigid flex substrate, or other substrate.

Electrical components such as components 37 may be mounted to boards such as board 36. Electrical components 37 may include switches, resistors, inductors, capacitors, integrated circuits, connectors, cameras, sensors, speakers, or other device components. These components may be soldered or otherwise connected to board 36.

Display 14 may be a touch screen display. Touch screen displays such as display 14 of FIG. 3 may include an array of capacitive electrodes (e.g., transparent electrodes such as indium tin oxide electrodes), or may include a touch sensor array based on other touch technologies (e.g., resistive touch sensor structures, acoustic touch sensor structures, piezoelectric sensors and other force sensor structures, etc.) The touch structures for display 14 may be implemented on a dedicated touch sensor substrate such as a layer of glass or may be formed on the same layer of glass that is being used for other display functions. For example, touch sensor electrodes may be formed on a color filter array layer, a thin-film transistor layer, or other layers in a liquid crystal display (LCD).

Display 14 may, in general, be formed from any suitable type of display structures. Examples of display structures that may be used for display 14 include liquid crystal display (LCD) structures, organic light-emitting diode (OLED) structures, plasma cells, and electronic ink display structures. Arrangements in which display 14 is formed from liquid crystal display (LCD) structures are sometimes described herein as an example. This is merely illustrative. In general, display 14 may be formed using any suitable display technology.

Figure 4:
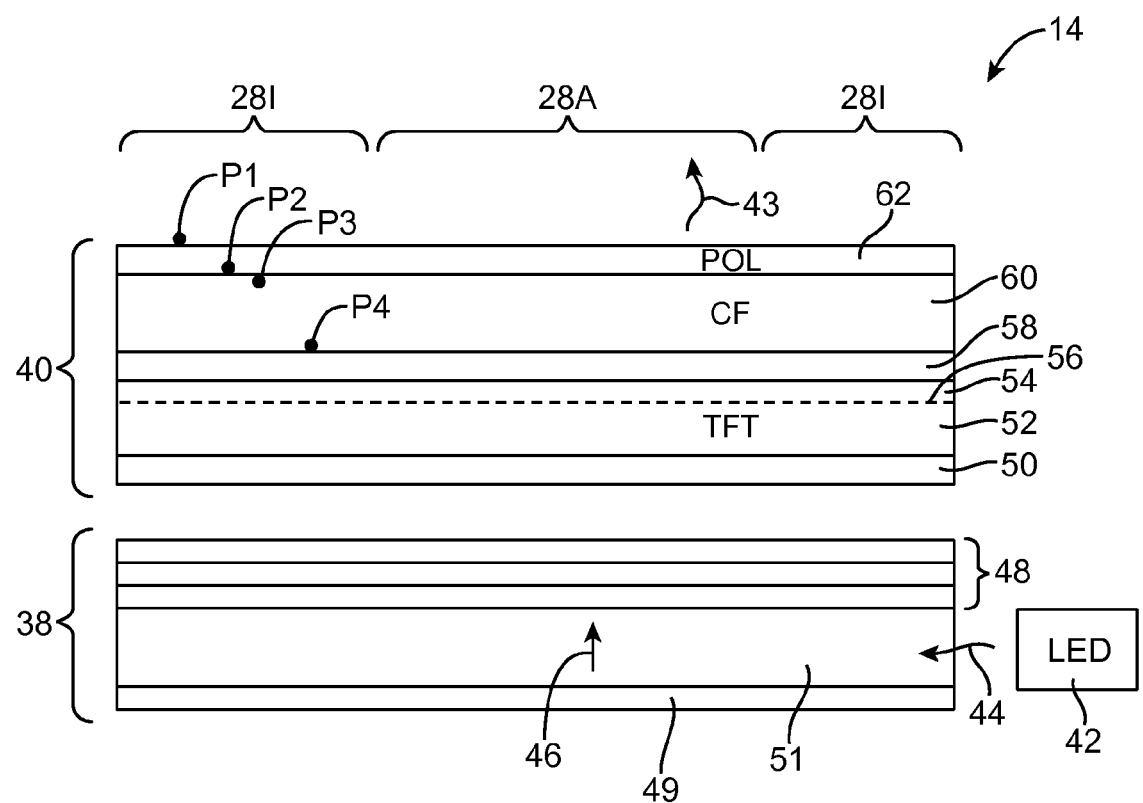
FIG. 4 is a cross-sectional side view of illustrative display structures in accordance with an embodiment of the present invention.

A cross-sectional view of display 14 of FIG. 2 is shown in FIG. 4. As shown in FIG. 4, display 14 may include a backlight unit (BLU) such as backlight unit 38. Light 44 for backlight unit 38 may be launched into light-guide panel 51 from light source 32. Light source 32 may be formed from an array of light-emitting diodes (as an example). Reflector 49 (e.g., white polyester) may be used to reflect light 44 upwards (outwards) in direction 46 through display module 40. Optical films 48 may include a diffuser layer and light collimating layers (as an example).

Display 14 and display module 40 may have an active region 28A that produces image pixel light 43 from an array of image pixels. Image pixel light 43 forms an image in active region 28A that may be viewed by a user of device 10. The image may include text, graphics, or other image information. A portion of display 14 and display module 40 such as region 28I may be inactive. Region 28I may have a shape that surrounds the periphery of display 14 and display module 40 as shown in FIG. 1 (as an example). Inactive region 28I generally does not contain active image pixels and may include an opaque masking layer to block interior structures from view. Backlight unit 38 may have a footprint that is aligned with active region 28A or may have edges that extend under some or all of inactive region 28I (as shown in FIG. 4).

Display module 40 may include a lower polarizer such as lower polarizer 50 and an upper polarizer such as polarizer 62. A thin layer (e.g., 3-5 microns) of liquid crystal material 58 may be interposed between color filter layer 60 and thin-film transistor layer 52.

Thin-film transistor layer 52 may be formed on a transparent planar substrate such as a layer of glass or plastic. The upper surface of thin-film-transistor layer 52 may contain pixel electrode structures and thin-film transistors (shown as circuitry 54 above dashed line 56). The circuitry on thin-film-transistor layer 52 may be organized into an array of image pixels that can be controlled to display images on display 14 for a user of device 10.

Color filter layer 60 may include colored filter pixel elements (e.g., red, green, and blue filter elements) that provide display 14 with the ability to display color images. Color filter layer 60 may be formed using a transparent planar substrate such as a glass or plastic substrate.

If desired, other layers of material may be included within display module 40 and backlight unit 38. For example, display module 40 and backlight unit 38 may include one or more layers of material for forming a touch sensor, layers of optical films such as birefringent compensating films, antireflection coatings, scratch prevention coatings, oleophobic coatings, layers of adhesive, etc.

Figure 5:
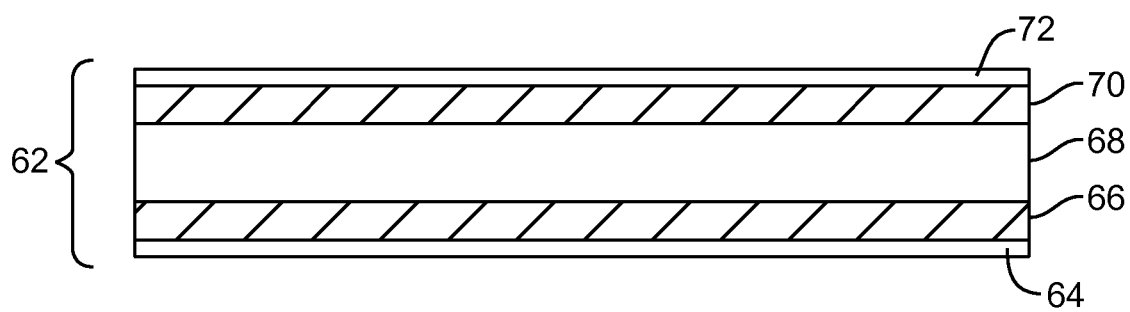
FIG. 5 is a cross-sectional side view of a polarizer for an electronic device display in accordance with an embodiment of the present invention.

Polarizers such as upper (outer) polarizer 62 and lower (inner) polarizer 50 may be formed from multiple layers of material that are laminated together. An illustrative laminated polarizer is shown in the cross-sectional side view of FIG. 5. As shown in FIG. 5, polarizer 62 (i.e., an upper polarizer in this example) may have polarizer film 68. Film 68 may be formed from a stretched polymer such as stretched polyvinyl alcohol (PVA) and may therefore sometimes be referred to as a PVA layer. Iodine may be placed on to the stretched PVA film so that iodine molecules align with the stretched film and form the polarizer. Other polarizer films may be used if desired. Polarizer film 68 may be sandwiched between layers 66 and 70. Layers 66 and 70 may be formed from a material such as tri-acetyl cellulose (TAC) and may sometimes be referred to as TAC films. The TAC films may help hold the PVA film in its stretched configuration and may protect the PVA film. Other films may be laminated to film 68 if desired.

Coating layer 72 may be formed from one or more films of material that provide polarizer 62 with desired surface properties. For example, layer 72 may be formed from materials that provide polarizer 62 with antiglare (light diffusing) properties, antireflection properties, scratch resistance, fingerprint resistance, and other desired properties. Layer 72 may be formed from one or more layers of material such as antireflection (AR) layers (e.g., films formed from a stack of alternating high-index-of-refraction and low-index-of-refraction layers), antiglare (AG) layers, antireflection-antiglare (AR/AG) layers, oleophobic layers, antiscratch coatings, or other coating layers. The functions of these layers need not be mutually exclusive. For example, an antiglare film in coating 72 may help provide polarizer 62 with scratch resistance.

Polarizer 62 may, if desired, be provided with a layer of adhesive such as adhesive 64 (e.g., optically clear adhesive) to help attach polarizer 62 to the upper surface of display module 40 (i.e., color filter 60 of FIG. 4). The thickness of polarizer 62 may be about 50-200 microns (as an example).

Figure 6:
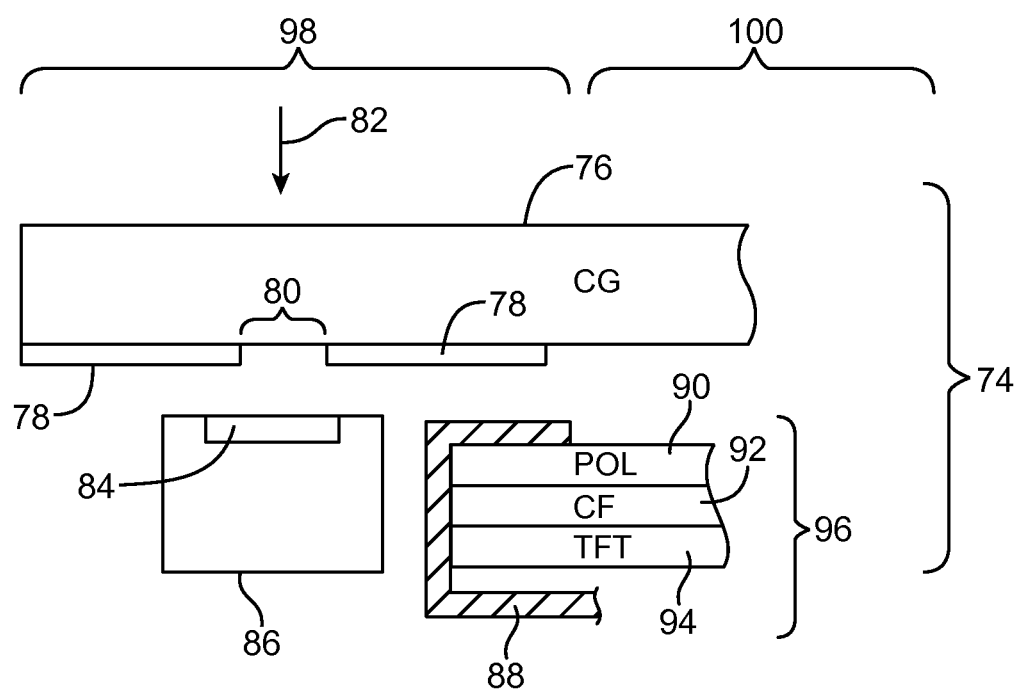
FIG. 6 is a cross-sectional side view of a conventional liquid crystal display (LCD) module in a portable computer.

It is often desirable to mount cameras within the interior of an electronic device. Conventionally, a camera may be mounted under a layer of cover glass in the inactive portion of a display. This type of arrangement is shown in FIG. 6. As shown in FIG. 6, conventional device structures 74 may include cover glass 76. Cover glass 76 may be associated with a display that has active and inactive regions. For example, cover glass 76 of FIG. 6 may be associated with inactive display region 98 and active display region 100.

Black ink layer 78 is formed on the underside of cover glass 76 in inactive region 98 and blocks internal components such as camera 86 from view. Black ink layer 78 has opening 80 for camera 86. During operation, light 82 from an image can pass through layer 76 and opening 80 into lens 84 of camera 86. Display module 96 is mounted under active region 100. Display module 96 includes color filter layer 92, thin-film transistor layer 94, upper polarizer 90, and other LCD layers mounted within chassis structure 88. Black ink 78 hides chassis structure 88 from view.

Figure 7:
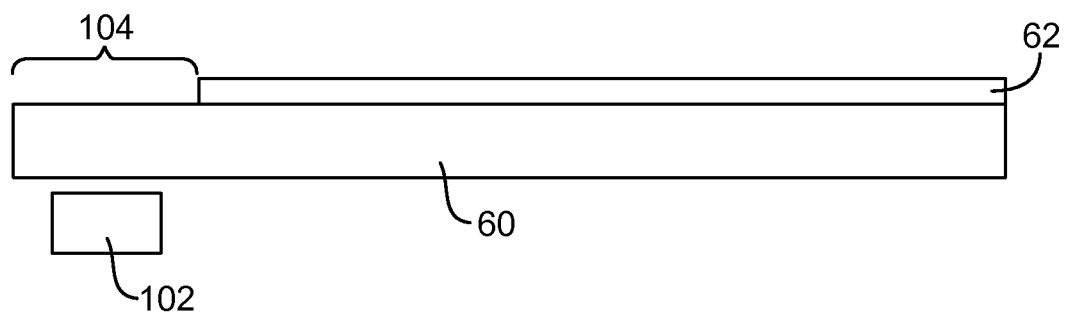
FIG. 7 is a cross-sectional side view of an illustrative display having a recessed polarizer layer that exposes internal device structures in accordance with an embodiment of the present invention.

The illustrative structures of display 14 of FIG. 4 do not include a cover glass layer. In this type of arrangement, it may be desirable to mount cameras and other internal structures under a portion of a housing that is separate from display 14 (e.g., under a camera opening in a bezel or other housing structure). If desired, a camera or other internal device structure may be mounted under a portion of the display module. As shown in FIG. 7, for example, internal structure 102 may be mounted below an edge portion of color filter layer 60 (as an example). Internal structure 102 may be a camera (e.g., a camera that receives image light through layer 60, a sensor that receives light through layer 60, patterned information structures in the shape of a logo or other information such as structures 26 of FIG. 1, a status indicator (e.g. a status indicator element that emits light through layer 60), or other suitable internal structures in device 10.

Polarizer 62 may interfere with the operation of internal structure 102. For example, if internal structure 102 is a camera, the presence of polarizer 62 above the camera's image sensor may reduce light intensity and may therefore adversely affect camera performance. As another example, if internal structure 102 includes patterned structures that form a logo or other information, the presence of polarizer 62 may make it difficult to view internal structures 102 from the exterior of device 10. The operation of light sensors, status indicators, and other electronic components may also be adversely affected by the presence of polarizer layer 62.

One way to minimize any possible adverse impact from polarizer layer 62 involves removing portions of polarizer layer 62, so that color filter layer 60 is exposed. Portions of polarizer layer 62 may be removed following attachment of layer 62 to layer 60 or portions of polarizer layer 62 may be removed prior to attaching layer 62 to layer 60. The portions of layer 62 that are removed may have circular shapes (e.g., for forming a circular opening that is aligned with a camera lens), rectangular shapes (e.g., for exposing a logo or other information that has a rectangular outline), or other suitable shapes. As shown in the example of FIG. 7, polarizer 62 may be removed in region 104 along the edge portion of color filter 60, to avoid overlap between polarizer 62 and internal structures.

Arrangements of the type shown in FIG. 7 may give rise to a step in height at the end of polarizer 62 (i.e., at the interface between polarizer 62 and region 104). In some circumstances, this step may be visible or may allow polarizer 62 to peel away from color filter 60.

To avoid creating a step in height, the optical properties in polarizer may be modified to create step-less unpolarized windows that are integral parts of polarizer 62. For example, a portion of polarizer 62 may be exposed to light with an intensity and wavelength suitable for bleaching (depolarizing) the polarizer material within polarizer layer 62. Following light exposure, unexposed portions of polarizer 62 will function as polarizer layers. The exposed portions of polarizer 62 will not have significant polarizing properties and will serve as transparent windows. Unpolarized windows may also be formed in polarizer 62 using other localized treatments (e.g., exposure to a liquid that chemically bleaches polarizer 62, etc.). Using this type of arrangement, polarizer 62 and its unpolarized window regions can smoothly overlap inactive display regions 28I (see, e.g., FIG. 1) without introducing steps in height.

Figure 8:
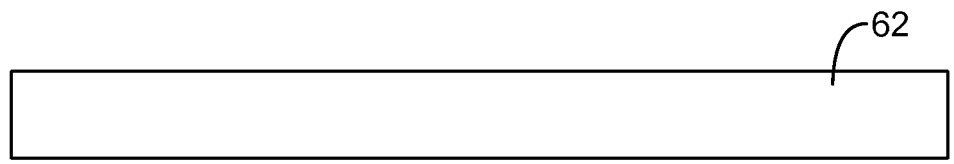
FIG. 8 is a cross-sectional side view of a polarizer layer prior to treatment to form a transparent unpolarized window in accordance with an embodiment of the present invention.
Figure 9:
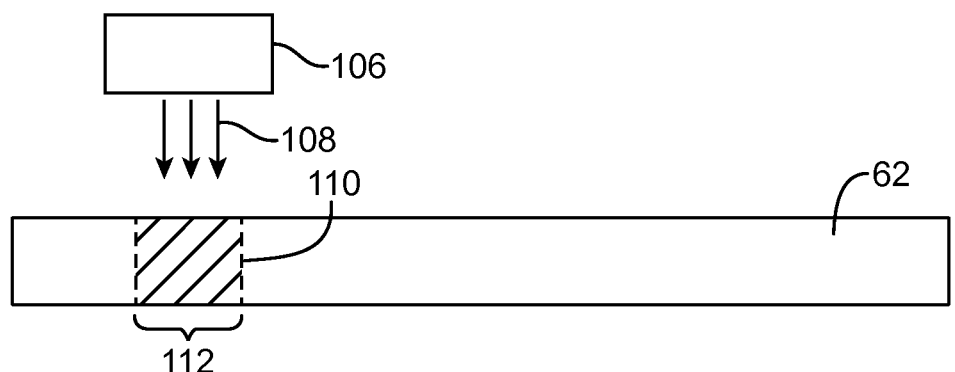
FIG. 9 is a cross-sectional side view of the polarizer of FIG. 8 during exposure of a portion of the polarizer to ultraviolet light to bleach the polarizer and thereby form a window in the polarizer in accordance with an embodiment of the present invention.
Figure 10:
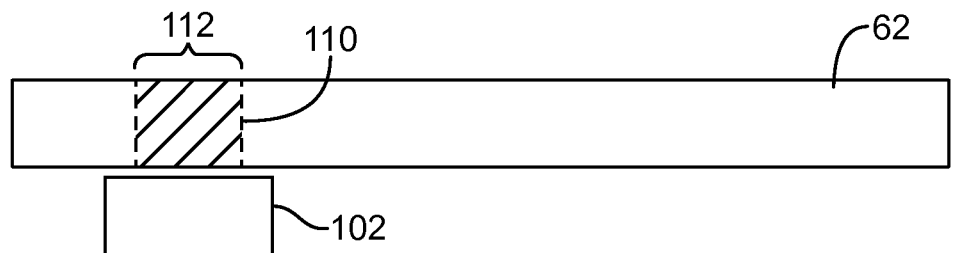
FIG. 10 is a cross-sectional side view of a polarizer having a transparent unpolarized (bleached) window with which an internal device structure has been aligned in accordance with an embodiment of the present invention.

An illustrative process for bleaching polarizer 62 by applying light to a localized region of polarizer 62 is shown in FIGS. 8, 9 and 10. Initially, polarizer layer 62 is formed from a layer of polarizer material with no bleached regions (FIG. 8). As shown in FIG. 9, light source 106 may emit light 108 (e.g., ultraviolet light) that strikes a localized region of the surface of polarizer 62. Light 108 may be localized using a focusing arrangement (e.g., using a lens), using a mask (e.g., using a shadow mask or a patterned masking layer formed on the surface of polarizer 62), using other suitable masking techniques, or using a combination of these techniques. The localization of light 108 within polarizer 62 causes portion 110 of polarizer 62 to lose its polarizing properties and form a clear window such as window 112.

As shown in FIG. 10, polarizer layer 62 may be mounted in a device so that internal structure 102 is aligned with window 112. The material in window 110 (e.g., portion 110 of polarizer 62) is not polarized, so window 112 may allow light to pass freely between the exterior surface of polarizer layer 62 and internal structure 102.

Figure 11:
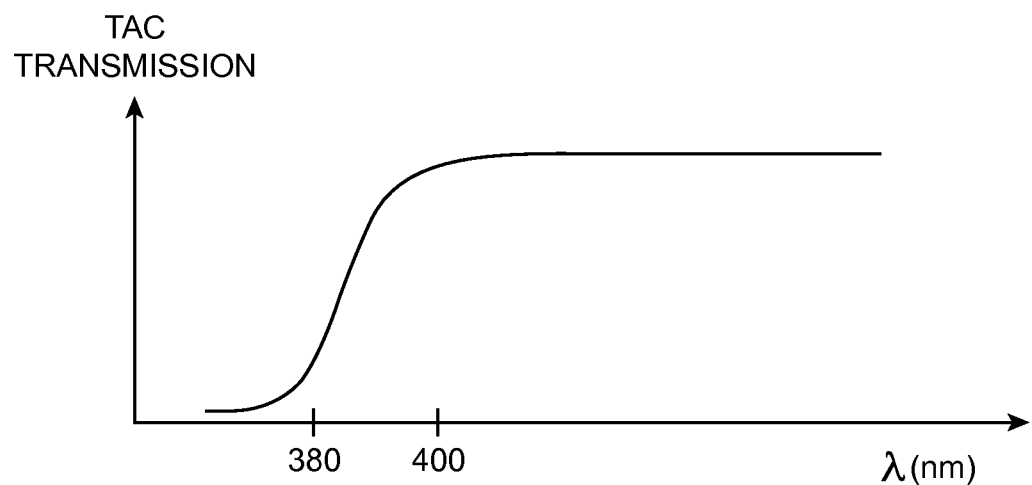
FIG. 11 is a graph showing how transmission for a film such as a triacetate cellulose (TAC) film within a laminated polarizer may vary as a function of wavelength.
Figure 12:
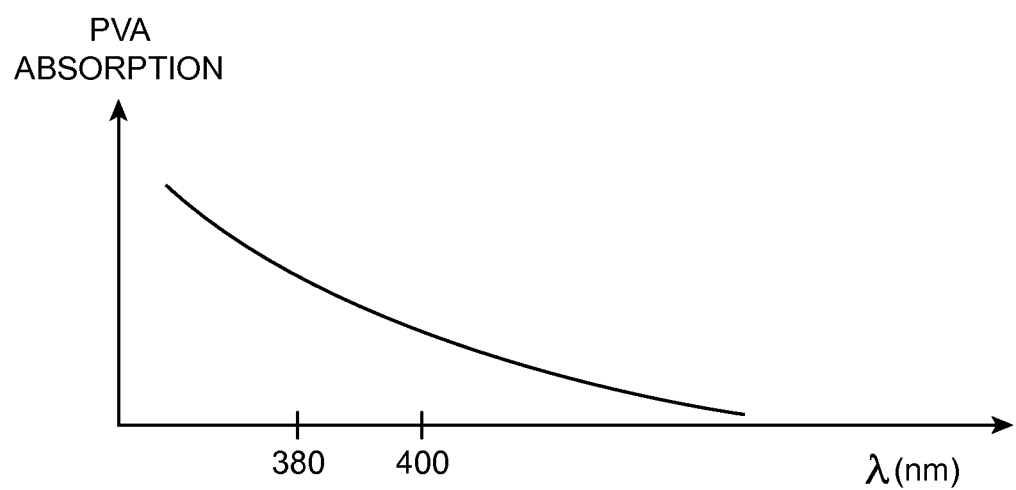
FIG. 12 is a graph showing how absorption for a film such as a polyvinyl alcohol film in a laminated polarizer may vary as a function of wavelength.

The intensity and wavelength of light 108 may be selected so as to effectively bleach polarizer 62 without inducing optical damage to polarizer 62 that could adversely affect the transparency and optical clarity of window 112. If, for example, polarizer 62 is formed from a stretched PVA layer with a coating of aligned iodine molecules such as layer 68 of FIG. 5, light 108 is preferably able to break iodine bonds or otherwise disorder the PVA polarizer layer without damaging adjacent layers such as TAC layers 66 and 70. As shown in FIG. 11, TAC layers 66 and 70 may exhibit satisfactory transmission at wavelengths above about 380 nm or 400 nm. FIG. 12 shows how PVA absorption (i.e., the absorption in layer 68 of FIG. 5) may decrease as a function of increasing wavelength.

Taking into consideration the properties of TAC films 66 and 70 (per FIG. 11) and the properties of PVA film (per FIG. 12), satisfactory disruption of the polarizer in layer 68 without excessive absorption and resulting damage in TAC layers 66 and 68 may be achieved by operating source 106 of FIG. 9 with wavelengths in the range of 380-420 or other wavelengths. Longer wavelengths will be less efficient at bleaching polarizer 62, as indicated by the graph of FIG. 12, but longer wavelengths will also be less likely to be absorbed in TAC layers 66 and 70 and will therefore tend to be less likely to adversely affect the transparency of TAC layers 66 and 70. Ultraviolet light (light with a wavelength of less than 420 nm or less than 400 nm in wavelength) is typically satisfactory for light-bleaching polarizer layer 68, but other types of light may be used if desired.

The intensity of light 108 may be adjusted based on its wavelength. For example, in a scenario in which light 108 has wavelengths in the range of 380-420 nm (as an example), a dose of about 10 $J/cm^2$ to 100 $J/cm^2$ (or more or less than 10 $J/cm^2$ or 100 $J/cm^2$) may be applied to layer 62 to create window 112.

Figure 13:
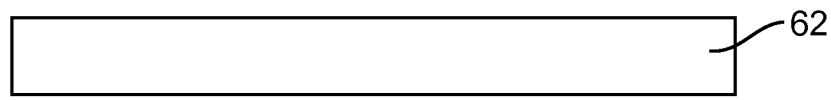
FIG. 13 is a cross-sectional side view of a polarizer prior to formation of a patterned masking layer on the surface of the polarizer in accordance with an embodiment of the present invention.
Figure 14:
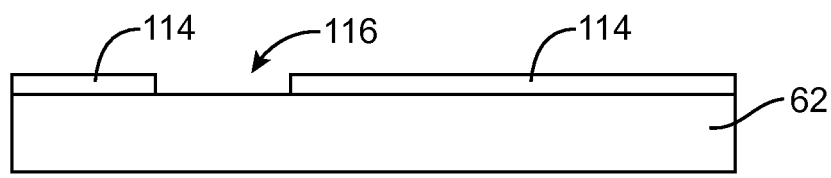
FIG. 14 is a cross-sectional side view of the polarizer layer of FIG. 14 following formation of a patterned masking layer in accordance with an embodiment of the present invention.
Figure 15:
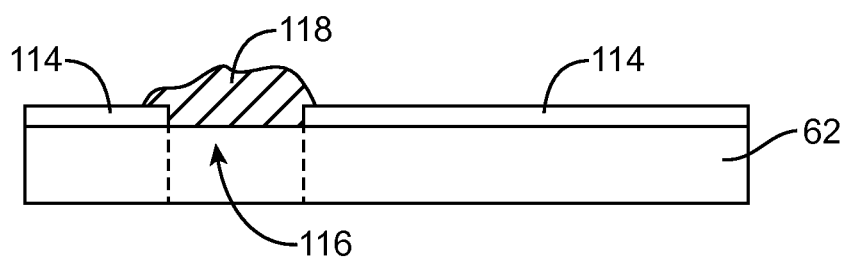
FIG. 15 is a cross-sectional side view of the masked polarizer layer of FIG. 14 showing how a liquid depolarizing agent may be applied on top of the patterned masking layer to form an unpolarized region within the polarizer layer in accordance with an embodiment of the present invention.
Figure 16:
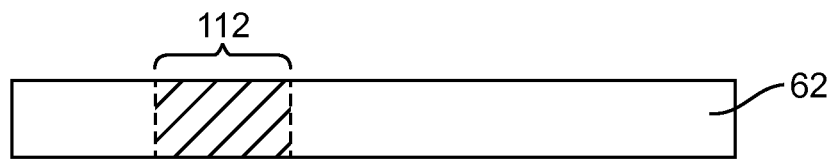
FIG. 16 is a cross-sectional side view of the polarizer layer of FIG. 15 following removal of the masking layer to complete formation of a chemically bleached unpolarized window in the polarizer layer in accordance with an embodiment of the present invention.

Unpolarized window 112 in polarizer layer 62 may also be formed by chemical treatment. Consider, as an example, the application of bleaching liquid to polarizer layer 62, as illustrated in FIGS. 13-16. As shown in FIG. 13, polarizer layer 62 may initially contain no window regions. A masking layer such as masking layer 114 of FIG. 14 may be applied to the surface of polarizer layer 62. Masking layer 114 may contain one or more openings such as opening 116. Masking layer 114 may be patterned using photolithographic techniques (e.g. when masking layer 114 is formed from a photosensitive material such as photoresist), may be patterned by pad printing, spraying, inkjet printing, etc. Opening 116 may have a size and shape suitable for forming an unpolarized window within polarizer 62. As shown in FIG. 15, after layer 114 has been formed, a bleaching agent such as liquid 118 may be deposited on the surface of layer 62 in opening 116. Liquid 118 may be, for example, a base such as NaOH, KOH, or other substance that removes the polarization from exposed portions of polarizer layer 62. As shown in FIG. 16, following application and removal of masking layer 114 and liquid 118 (or other suitable bleaching agent), polarizer 62 may remain polarized in all areas except unpolarized window 112.

During assembly of polarizer 62 into device 10, window 112 may be aligned with a camera, information structures such as a logo, or other internal components in device 10, as described in connection with window 112 of FIG. 10. To ensure that potentially unsightly internal portions of device 10 are blocked from view, device 10 may be provided with one more opaque masks. For example, one or more opaque masking layers may be incorporated onto one or more of the layers of material in display module 40 of FIG. 4. The opaque masking layer may be formed from black ink, ink with other (non-black) colors (e.g., white, silver, gray, red, blue), an opaque polymer, a layer of metal, or other suitable opaque substances. Examples of locations in which the opaque masking layer may be formed in module 40 include position P1 on the top of polarizer 62, position P2 on the lower surface of polarizer 62, position P3 on the top surface of color filter layer 60, and position P4 on the lower surface of color filter layer 60. Other masking layer locations and combinations of masking layer locations may be used if desired.

Figure 17:
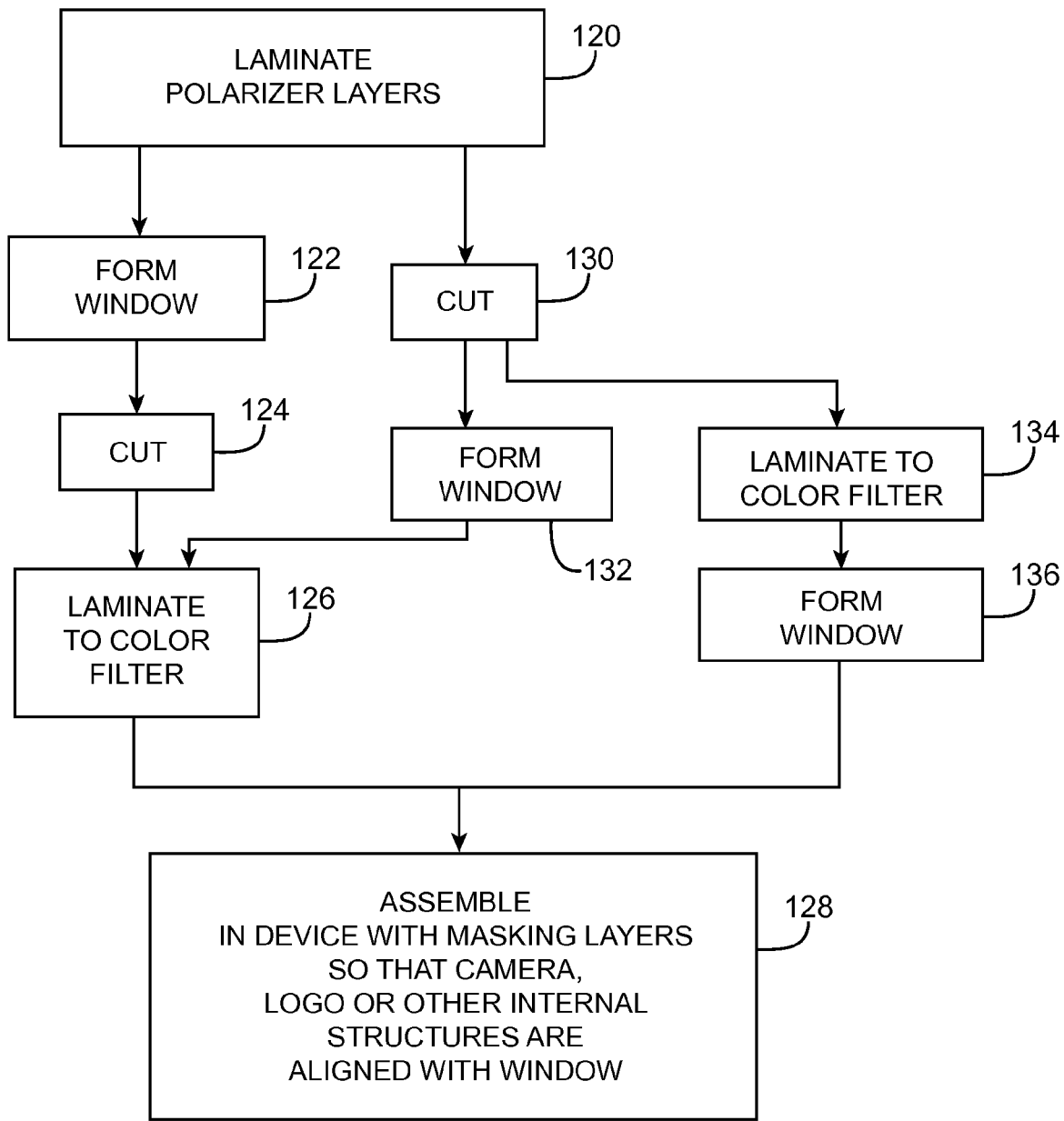
FIG. 17 is a flow chart of illustrative steps involved in forming display structures including a polarizer layer with an unpolarized window and an opaque masking layer with an opening in accordance with an embodiment of the present invention.

Illustrative steps involved in forming windows in polarizer layer 62 and in forming opaque masking layers and display module structures within an electronic device are shown in FIG. 17.

At step 120, layers of material such as TAC films 66 and 70 and polarizer layer 68 may be laminated together to form polarizer 62. For example, an extrusion tool may be used to stretch PVA layer 68 and laminating rollers may be used to laminating layers 66 and 70 to layer 68. Iodine may be incorporated into the polarizer (e.g., on layer 68).

If desired, window 112 may be formed in the laminated polarizer layers during the operations of step 122 (i.e., prior to dividing the TAC and PVA sheets into device-sized panels with a die press or other cutting tool at step 124). Following cutting to form individual panels of polarizer, the polarizer may be laminated to color filter layer 60 (step 126).

Alternatively, the layers of polarizer that have been laminated together during the operations of step 120 may be divided into individual panels during the operations of step 130 (i.e., before forming window 112 in polarizer 62 during the operations of step 132). With this type of approach, the panel of polarizer in which window 112 is formed during step 132 may be laminated to color filter layer 60 at step 126.

If desired, polarizer that has been cut into device-sized panels during the operations of step 130 may be laminated to color filter layer 60 (step 134) before forming window 112 (step 136).

Regardless of the order in which polarizer 62 is processed to form window 112 and attached to color filter layer 60, polarizer 62 and other display structures may, during the operation of step 128 be assembled into device 10 so that a camera or other internal structures (see, e.g., structure 102 of FIG. 10) are mounted in alignment with window 112. Prior to the assembly operations of step 128 or during assembly, opaque masking layers may be formed on the layers of material that form display 14. For example, a patterned layer of ink or other opaque masking material may be formed in locations such as locations P1, P2, P3, and P4 in display module 40 (see, e.g., FIG. 4). Patterned masking layers may be formed using physical vapor deposition, pad printing, screen printing, spraying, dipping, inkjet printing, shadow mask deposition, photolithographic patterning, or other suitable deposition and patterning techniques. Examples of materials that may be used as opaque masking layers include metals, polymers, ink, paint, tinted adhesive, oxides (e.g., metal oxides), fiber-based composites, etc.

Figure 18:
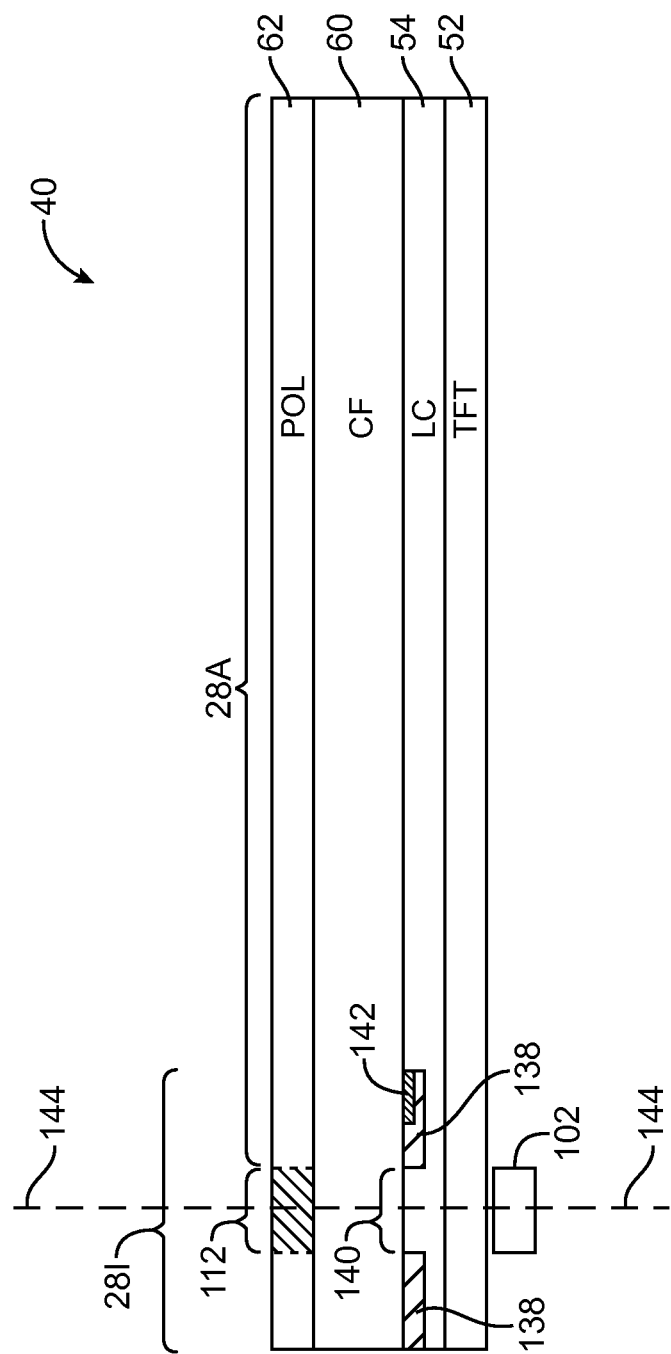
FIG. 18 is a cross-sectional side view of illustrative display structures having a polarizer with an unpolarized window and a patterned opaque masking layer formed on the inner surface of a color filter layer in accordance with an embodiment of the present invention.

FIG. 18 is a cross-sectional side view of display structures in which an opaque masking layer has been formed in a position such as position P4 of FIG. 4 under color filter layer 60. As shown in FIG. 18, display module 40 may have active region 28A and inactive region 28I. Opaque masking layer 138 may be formed on the inner surface of color filter layer 60. Opaque masking layer 138 may be patterned to form an opening such as opening 140. Opening 140 may have a size and shape that allows some or all of opening 140 to overlap window 112 in polarizer layer 62. This allows light to pass between interior structure 102 and the exterior of module 40 adjacent to polarizer 62 via window 112, color filter 60, opening 140, and thin-film transistor layer 52 (as an example). During deposition operations, some or all of masking layer 138 may overlap existing structures on color filter 60 (e.g., structures such as structure 142 of FIG. 18 that are formed of chromium or other materials and that are used in forming light-blocking patterns for the color filter elements in filter 60). If desired, some of structures 142 may be used in forming layers such as layer 138.

As shown in FIG. 18, internal structures 102 may be aligned along common vertical axis 114 with window 112 and mask opening 140. Structures 102 may include a camera (image sensor), a status indicator, information structures such as a logo or other printed or patterned information, a sensor, etc.

Figure 19A:
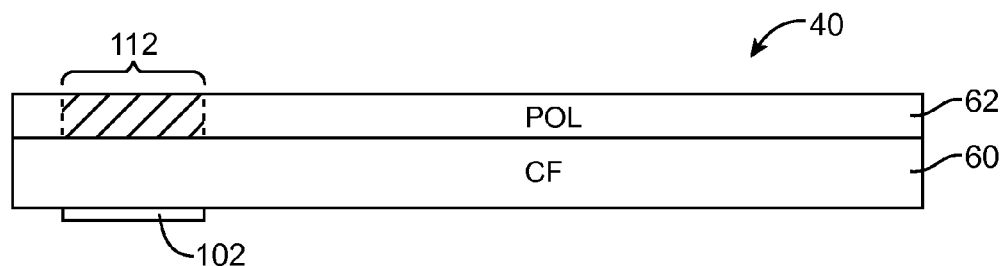
FIG. 19A is a cross-sectional side view of illustrative display structures having a polarizer with an unpolarized window that is aligned with a logo or other information printed on the inner surface of a color filter layer using physical vapor deposition (PVD) in accordance with an embodiment of the present invention.
Figure 19B:
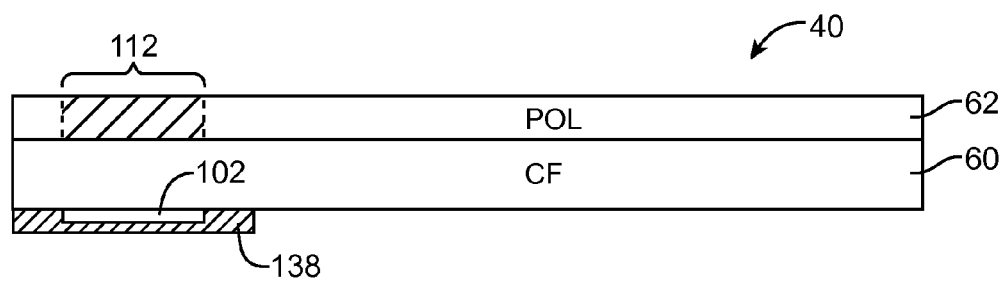
FIG. 19B is a cross-sectional side view of the display structures of FIG. 19A following formation of an opaque masking layer over the logo in accordance with an embodiment of the present invention.
Figure 19C:
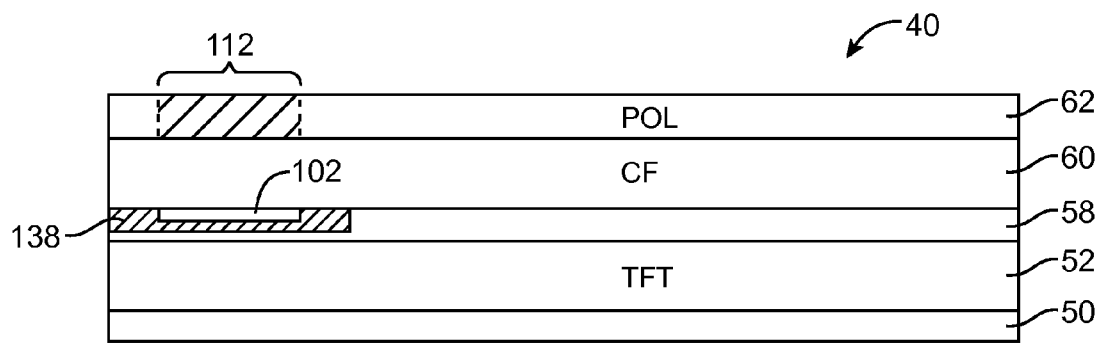
FIG. 19C is a cross-sectional side view of the display structures of FIG. 19B after the color filter and polarizer layers have been connected to other display structure layers such as a thin-film-transistor layer in accordance with an embodiment of the present invention.

FIGS. 19A, 19B, and 19C show how internal structures 102 such as information structures that form a logo or other information may be formed on the lower surface of color filter layer 60 in a configuration in which masking layer 138 is being formed in a position such as position P4 of FIG. 4. As shown in FIG. 19A, structures 102 may be formed on the lower surface of color filter 60. Structures 102 may, for example, be formed under window 112 in polarizer layer 62 (i.e., so that the outline of structures 102 is contained within the outline of window 112 and so that window 112 completely overlaps structures 102). Structures 102 may be formed from ink, metal, paint, polymer, or other materials and may be deposited using physical vapor deposition (PVD) or other suitable deposition and patterning techniques.

Following deposition of structures 102 on the inner surface of color filter layer 60, opaque masking layer 138 may be formed over structures 102, as shown in FIG. 19B. In particular, a layer of black ink or other opaque masking substance may be formed over structures 102 (e.g., a PVD logo) using screen printing, inkjet printing, pad printing, or other suitable deposition techniques. Opaque masking layer 138 may cover the inactive portion of display 14 (see, e.g., inactive portion 28I of FIG. 1).

As shown in FIG. 19C, following formation of structures 102 (e.g., a PVD logo or other information) and formation of patterned masking layer 138, display module 40 may be completed by attaching lower polarizer 50 and thin-film-transistor layer 52 below liquid crystal material 58, color filter layer 60, and upper polarizer 62.

Figure 20:
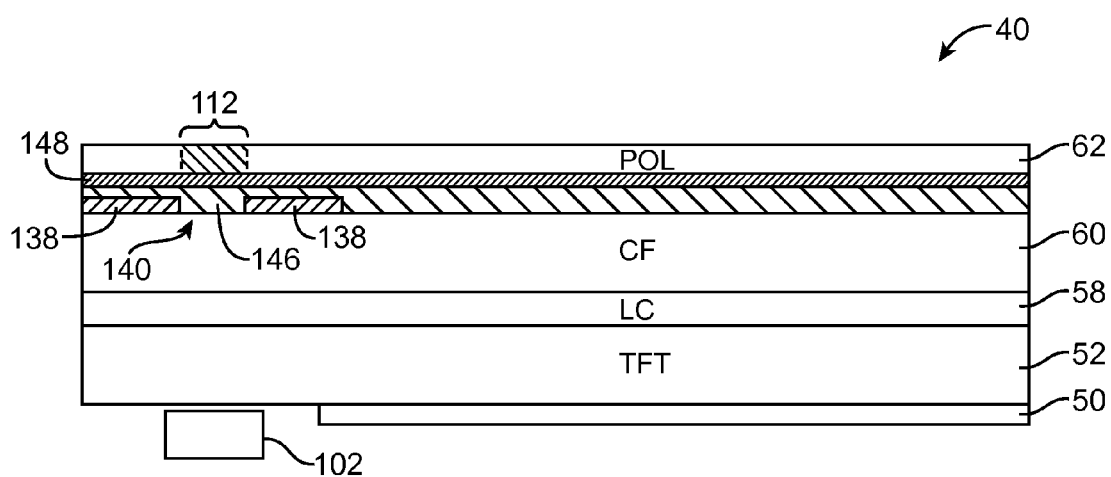
FIG. 20 is a cross-sectional side view of illustrative display structures having a polarizer with an unpolarized window and a patterned opaque masking layer formed on the outer surface of a color filter layer in accordance with an embodiment of the present invention.

FIG. 20 is a cross-sectional side view of display module 40 in a configuration in which opaque masking layer 138 has been formed in a position such as position P3 of FIG. 4 (i.e., on top of color filter layer 60). As shown in FIG. 20, polarizer 62 may be provided with unpolarized window 112 that is aligned with internal structures 102 (e.g., a logo or other information, a camera, a sensor or other electrical component, etc.). Opaque masking layer 138 may have an opening such as opening 140 that is aligned with window 112 and structures 102. Polarizer layer 62 may be attached to display module 40 using adhesive 148 (e.g., a layer of adhesive that is about 0.5 to 6 microns thick). Opaque masking layer 138 may be about 40 to 120 microns thick (as an example). If desired, planarizing layer 146 may be interposed between polarizer 62 and the upper surface of color filter layer 60 to help accommodate the thickness of opaque masking layer 138. Planarizing layer 146 may be formed from epoxy or other adhesive (e.g., some of adhesive 148), spin-on-glass, polymer, or other clear material. Opaque masking layer 138 may be formed from white ink, black ink, non-black colored ink, or other suitable opaque materials.

Figure 21:
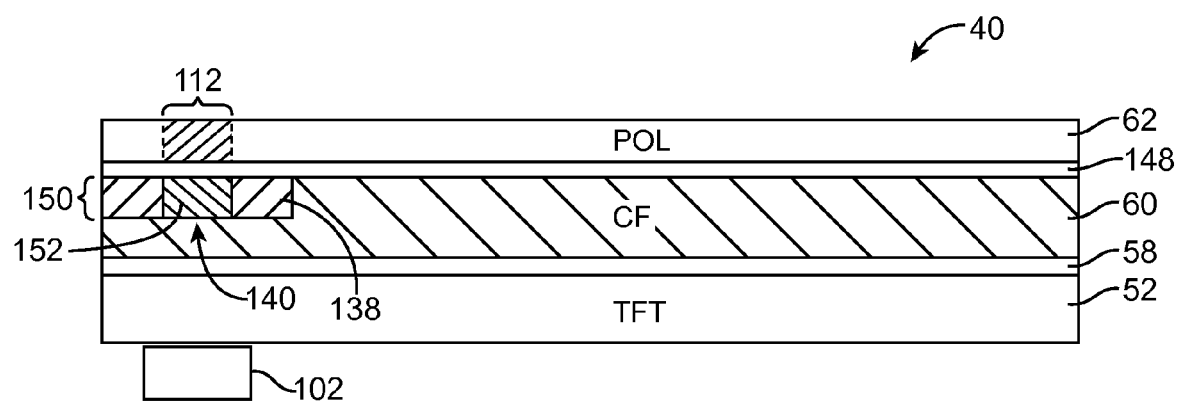
FIG. 21 is a cross-sectional side view of illustrative display structures having a polarizer with an unpolarized window and a patterned opaque masking layer formed within a recessed region on the outer surface of a color filter layer in accordance with an embodiment of the present invention.

As shown in the cross-sectional side view of FIG. 21, color filter layer 60 may, if desired, be provided with a recess such as recess 150. Recess 150 may have a depth (thickness) comparable to the thickness of opaque masking layer 138 (e.g., about 40-120 microns as an example). In this type of configuration, opaque masking layer (and, if desired, optional filler material 152) may be recessed within recess 150 so that the outermost surface of opaque masking layer 138 (and optional filler material 152) is flush or nearly flush with the outermost surface of color filter layer 160. Filler material 152 may be formed from adhesive (e.g., some of adhesive 148), polymer, or other suitable transparent materials.

Figure 22:
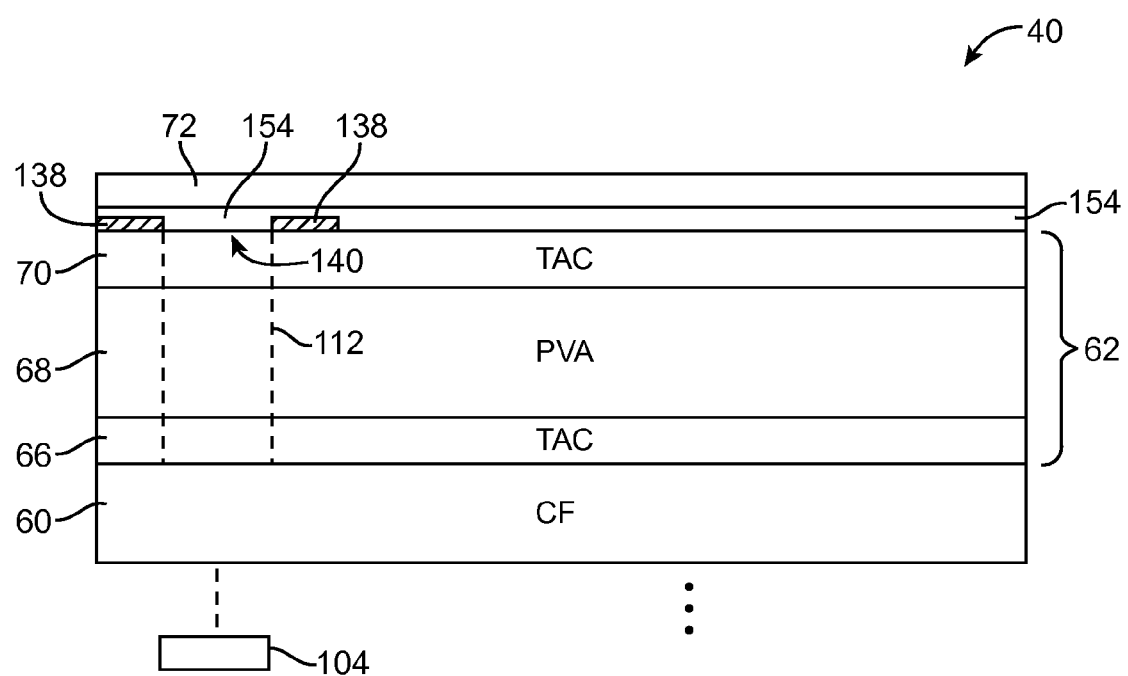
FIG. 22 is a cross-sectional side view of illustrative display structures having a polarizer with an unpolarized window and a patterned opaque masking layer that is formed on a layer of the polarizer such as a triacetate cellulose layer and that is interposed between the outer surface of the triacetate cellulose layer and an inner surface of a cover film in accordance with an embodiment of the present invention.

A cross-sectional side view of an illustrative configuration that may be used for display module 40 in which opaque masking layer 138 is formed on polarizer 62 (e.g., in position P1 of FIG. 4) is shown in FIG. 22. As shown in FIG. 22, polarizer 62 may include a polarizer layer such as PVA layer 68 and TAC layers such as TAC layers 66 and 70 or other optical films. Polarizer 62 may be attached to color filter layer 60 (e.g., using adhesive). Opaque masking layer 138 may be formed on the surface of TAC layer 70. Opening 140 may be aligned with window 112 in polarizer 62. Cover film 72 may be attached to the outer surface of TAC layer 70 (e.g., to form the outermost surface of display module 40). Cover film 72 may be a cover layer that includes one or more layers such as antireflection layers, antiglare layers, antiscratch layers, etc.

Cover film 72 may be dispensed from one or more rolls of film and may be attached to TAC layer 70 using adhesive 154. In this type of arrangement, opaque masking layer 138 may be aligned with the panel of material that forms polarizer 62 to a relatively high tolerance (e.g., to a 0.1-0.4 mm tolerance), because layer 138 can be aligned directly to the polarizer panel during printing operations or other opaque masking layer deposition operations (as an example). If desired, opaque masking layer 138 may be deposited onto the underside of cover film 72 before cover film 72 is attached to polarizer 62.

Figure 23:
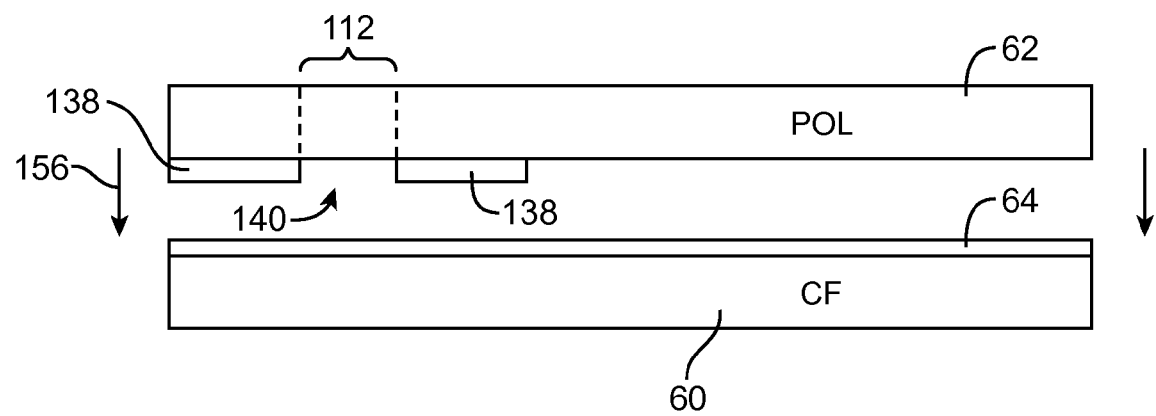
FIG. 23 is a cross-sectional side view of illustrative display structures having a polarizer with an unpolarized window and a patterned opaque masking layer formed on the inner surface of a polarizer layer in accordance with an embodiment of the present invention.

FIG. 23 is a cross-sectional side view of illustrative structures for display module 40 showing how opaque masking layer 138 may be formed on the underside of polarizer 62 in alignment with window 112. Adhesive 64 may be used to attach polarizer 62 to color filter layer 60 when polarizer 62 is moved in direction 156. A recess may be provided in color filter layer 60 to help accommodate the thickness of opaque masking layer 138, a layer of planarizing material may be interposed between polarizer 62 and color filter 60, or other actions may be taken to help ensure that polarizer 62 is satisfactorily attached to color filter 60.

The foregoing is merely illustrative of the principles of this invention and various modifications can be made by those skilled in the art without departing from the scope and spirit of the invention.

What is claimed is:

1. An electronic device, comprising:
a display having an active region and an inactive region;
a polarizer in the display, wherein the polarizer overlaps the active region and the inactive region; and
an unpolarized window in the polarizer within the inactive region, wherein the unpolarized window contains material from the polarizer.

2. The electronic device defined in claim 1 wherein the polarizer comprises a layer of polarizing material and wherein the unpolarized window comprises a bleached portion of the layer of polarizing material.

3. The electronic device defined in claim 1 wherein the polarizer comprises a layer of polarizing material and wherein the unpolarized window comprises an ultraviolet-light-bleached portion of the layer of polarizing material.

4. The electronic device defined in claim 3 wherein the polarizer comprises iodine and wherein the layer of polarizing material comprises a layer of polyvinyl alcohol.

5. The electronic device defined in claim 1 wherein the polarizer comprises a layer of polarizing material and wherein the unpolarized window comprises a chemically bleached portion of the layer of polarizing material.

6. The electronic device defined in claim 5 wherein the polarizer comprises iodine and wherein the layer of polarizing material comprises a layer of polyvinyl alcohol.

7. The electronic device defined in claim 1 further comprising an electronic component mounted in alignment with the unpolarized window.

8. The electronic device defined in claim 1 further comprising a camera that receives light through the unpolarized window.

9. The electronic device defined in claim 8 further comprising a logo that receives light through the unpolarized window.

10. The electronic device defined in claim 9 wherein the display comprises a color filter layer and wherein the logo comprises material on the color filter layer.

11. The electronic device defined in claim 10 further comprising an opaque masking layer that covers the logo.

12. The electronic device defined in claim 11 further comprising a thin-film transistor layer in the display, wherein the opaque masking layer and the logo are interposed between the color filter layer and the thin-film transistor layer.

13. Apparatus, comprising:
a color filter layer;
a thin-film transistor layer;
an opaque ink layer that is interposed between the color filter layer and the thin-film transistor layer; and
first and second polarizers, wherein the first polarizer comprises an unpolarized window and wherein the opaque ink layer has an opening that is aligned with the unpolarized window.

14. The apparatus defined in claim 13 wherein the color filter layer and the thin-film transistor layer are interposed between the first polarizer and the second polarizer, wherein the color filter layer has an outer surface and an inner surface and wherein at least some of the ink layer is formed on the inner surface.

15. The apparatus defined in claim 14 further comprising a camera that receives light through the unpolarized window and the opening.

16. Apparatus, comprising:
a color filter layer;
a thin-film transistor layer;
an opaque ink layer that is interposed between the color filter layer and the thin-film transistor layer; and
first and second polarizers, wherein the color filter layer and the thin-film transistor layer are interposed between the first polarizer and the second polarizer, wherein the color filter layer has an outer surface and an inner surface, wherein at least some of the ink layer is formed on the inner surface, wherein the first polarizer comprises an unpolarized window and wherein the apparatus further comprises a logo that is visible through the unpolarized window.

17. Apparatus, comprising:
a color filter layer;
a thin-film transistor layer;
first and second polarizers, wherein the color filter layer and the thin-film transistor layer are interposed between the first polarizer and the second polarizer and wherein the color filter layer is interposed between the first polarizer and the thin-film transistor layer; and
an opaque masking layer that is interposed between the first polarizer and the color filter layer.

18. The apparatus defined in claim 17 wherein the color filter layer comprises portions defining a recess and wherein the opaque masking layer is formed on the color filter layer in the recess.

19. The apparatus defined in claim 17 wherein the opaque masking layer comprises ink.

20. The apparatus defined in claim 17 wherein the first polarizer comprises an unpolarized window and wherein the opaque masking layer has an opening that is aligned with the unpolarized window.

21. The apparatus defined in claim 20 further comprising a camera that receives light through the unpolarized window and the opening.

22. The apparatus defined in claim 17 wherein the first polarizer comprises an unpolarized window and wherein the apparatus further comprises a logo that is visible through the unpolarized window.

23. Apparatus, comprising:
a color filter layer;
a thin-film transistor layer;
first and second polarizers, wherein the color filter layer and the thin-film transistor layer are interposed between the first polarizer and the second polarizer and wherein the color filter layer is interposed between the first polarizer and the thin-film transistor layer;
an opaque masking layer on the first polarizer; and
a cover film, wherein the cover film comprises a coating selected from the group consisting of: an antireflection coating and an antiglare coating.

24. The apparatus defined in claim 23 wherein the opaque masking layer is interposed between the cover film and the first polarizer.

25. The apparatus defined in claim 23 wherein the first polarizer comprises first and second triacetate cellulose layers and a polyvinyl alcohol film interposed between the first and second triacetate cellulose layers and wherein the opaque masking layer is formed on the first triacetate cellulose layer.

26. The apparatus defined in claim 25 wherein the coating is the antireflection coating.

27. The apparatus defined in claim 25 wherein the coating is the antiglare coating.

28. The apparatus defined in claim 23 wherein the opaque masking layer comprises ink.

29. Apparatus, comprising:
a color filter layer;
a thin-film transistor layer;
first and second polarizers, wherein the color filter layer and the thin-film transistor layer are interposed between the first polarizer and the second polarizer and wherein the color filter layer is interposed between the first polarizer and the thin-film transistor layer; and
an opaque masking layer on the first polarizer, wherein the first polarizer comprises an unpolarized window.

30. The apparatus defined in claim 29 further comprising a camera that receives light through the unpolarized window.

31. The apparatus defined in claim 29 wherein the apparatus further comprises a logo that is visible through the unpolarized window.

32. The apparatus defined in claim 29 wherein the opaque masking layer has an opening that is aligned with the unpolarized window.

33. The apparatus defined in claim 32 further comprising a camera, wherein the camera receives light through the unpolarized window and through the opening.

* * * * *